United States Patent [19]

Smith

[11] 4,037,265
[45] July 19, 1977

[54] ARC PREVENTING POWER SUPPLY SYSTEM

[75] Inventor: Henry D. Smith, Bluefield, W. Va.

[73] Assignee: Pemco Corporation, Tazewell County, Va.

[21] Appl. No.: 635,386

[22] Filed: Nov. 25, 1975

[51] Int. Cl.² ............................................. H02H 3/16
[52] U.S. Cl. .................................... 361/58; 323/89 R
[58] Field of Search ..................... 317/16, 18 C, 18 D, 317/20, 11 C; 323/89 R

[56] References Cited

U.S. PATENT DOCUMENTS

| 2,228,093 | 1/1941 | Sauer | 317/20 X |
| 3,473,091 | 10/1969 | Morris et al. | 317/18 D |
| 3,855,501 | 12/1974 | Agnew | 317/18 C |

*Primary Examiner*—Harry E. Moose, Jr.
*Attorney, Agent, or Firm*—Mason, Fenwick & Lawrence

[57] ABSTRACT

An improved electrical power supply system is disclosed for preventing arcing between two or more electrical machines energized by a common power source with at least one of said machines receiving power through a lengthy power cable, said cable having a grounding conductor connecting the external conductive housing of said machine to earth ground. A unique multi-winding transformer is connected between the common power source and the cable, so that arcing attributable to voltage induced in the cable grounding conductor is limited to non-dangerous current levels by an inductive impedance from a first winding of the multi-winding transformers, which winding in series with the cable grounding conductor. However, under short circuit conditions, another winding of the multi-winding transformer overcomes the inductive impedance of the first winding so that the current carrying capacity of the cable grounding conductor is no longer limited by the impedance of the first winding.

8 Claims, 3 Drawing Figures

ARC PREVENTING POWER SUPPLY SYSTEM

BACKGROUND OF THE INVENTION

Field of the Invention

This invention relates to electrical safety equipment and is specifically directed to an apparatus and a method for preventing electrical arcing between two or more machines receiving power through lengthy power cables from a common source. The invention is of particular importance in the suppression of the dangerous arcing which may occur when two or more electrical machines supplied from a common power source come into contact and then separate, as in the case of mining machinery operated in volatile, explosive atmospheres.

Description of the Prior Art

In numerous applications, power for electrical machinery is supplied through lengthy multi-conductor cables. Mining equipment, for example, may require cables from several hundred to several thousand feet long. Such lengthy cables are obviously highly susceptible to damage, giving rise to substantial shock and arc hazards.

The first type of hazard is the possibility of short circuits occurring between two or more power conductors or between a power conductor and a ground conductor. One cause of such short circuits is damage to the power cable. Another cause is equipment failure, such as insulation breakdown and current leaks. A short circuit may result in dangerous voltage being placed on conductive external housings of electrically powered machines, such as the conductive frame of a mining car, which is hazardous both to workers and equipment.

The second type of hazard is caused by small differences in the unbalanced voltages which may be induced in the grounding conductors of two power cables when they are connected under load conditions. Where, as is frequently the case, the grounding conductor in the power cable is not symmetrically positioned with respect to the power conductors, such as in some three-phase alternating current systems (as are usually used for high-power equipment), a voltage may be induced in the ground conductors. Since the ground conductors of any two such machines are connected to the same reference earth ground, the unbalanced induction of voltage in the ground conductors may result in there being several volts (e.g., up to 6 or 7 volts) difference in potential between the conductive external equipment housings (e.g., supporting vehicles, frames, bases, enclosures, etc.) to which the ground conductors are attached. Since low impedance circuits are involved, even a small voltage can cause large currents in the ground conductors should the equipment housings come into contact. Then, upon separation of the housings, arcing will occur. In a possibly explosive environment, such as in the atmosphere of a coal mine, this arcing presents a severe hazard.

Connecting a grounding conductor between the housing of the involved mining equipment and reference earth ground reduces the shock hazard due to short circuits. By monitoring current in the grounding conductor, short circuits may be automatically detected; once this condition is detected, power may be automatically disconnected from the cable. Usually, power for motors or other machinery is provided by a three-phase high-voltage source; then, a Y-connected power supply transformer secondary can be used to establish a common reference point at the junction of the transformer windings. Current in the grounding conductor will then be solely due to short circuits to the grounding conductor, stray fields, or two machines coming into contact.

Prevention of the hazard due to arcing is the object of a regulation promulgated by the U.S. Bureau of Mines, 30 C.F.R. Para. 75.524. The regulation places a limit on permissible arcing current level so that arc energy is maintained at an amount considered safe by the Bureau. The arcs proscribed are those which carry sufficient energy to ignite atmospheres typically encountered in mine environments. Under this standard, when two machine grounds are connected through a 0.1 ohm resistor of sufficient power handling capacity, no more than 1.0 amperes may flow between the machines.

Two systems have heretofore been proposed to alleviate the arcing problem.

The first system, proposed by the Bureau of Mines, was to incorporate, between the cable grounding conductors and the reference earth ground, an energy absorbing circuit comprising a full-wave diode bridge. With the proper number of diodes in each leg, the bridge would provide a high impedance path for applied A.C. voltages of about 7 volts or less, and a low impedance path for the higher voltages present when a power conductor short circuits to the cable grounding conductor or machine housing.

The second system, described in U.S. Pat. No. 3,855,501, involves the use of a saturable core reactor connected in series with the power grounding conductor. Under the modest voltages typically induced in a cable grounding conductor, the reactor's core is unsaturated, and a considerable impedance is present between the grounding conductor and reference earth ground, thereby limiting current. When a short circuit to the grounding conductor or machine housing occurs, however, the reactor core saturates and the reactor presents only a very small impedance between the cable grounding conductor and reference earth ground.

Both the diode bridge and the saturating core reactor introduce some impedance in series with the cable grounding conductor, under short circuit conditions. This is undesirable because the impedance may limit the current carrying capacity of the ground path and result in a dangerous voltage appearing on the machine housing. Also, the impedance element may fail as a result of the excessive power dissipation required under sustained short circuit conditions. In the case of the saturable core reactor, voltage spikes will appear on the machine frame during ground fault current flow. These voltages spikes occur during the brief interval at the beginning of each half cycle of current flow when the reactor core has not yet reached saturation. Although these spikes have low energy content, workmen are endangered by them since the housing of the associated machine is electrically "hot" with respect to earth at these times. The diode bridge system is not subject to this drawback, but is has other problems such as the fact that under short circuit conditions, high current levels may damage one or more diodes. In the most common failure modes this will result in the short circuiting of the damaged diode(s). Thus, once the power circuit short is relieved, there will certainly be less arc prevention capability, with it being quite likely there will be no arc prevention capability.

SUMMARY OF THE INVENTION

The two usual prior art solutions to the short circuit and arcing problems have inherent disadvantages which this invention is intended to alleviate.

It is therefore the object of the present invention to provide a new and improved power supply system for supplying electrical power from a main source of power to at least two separate machines, in which the hazards of potential shocks and intermachine arcing are substantially eliminated.

The present invention achieves the aforementioned object in its preferred embodiment by the use of a unique multi-winding transformer to eliminate the problems of, and attain superior results over, both the diode bridge and saturable core reactor prior art systems.

This multi-winding transformer, herein termed a balanced flux reactor (for reasons which will subsequently become apparent), is employed in combination with the main source of electrical power and a multi-conductor power cable having a cable grounding conductor. The balanced flux reactor has two sets of leads; for each lead in the first set of leads, there is a corresponding lead in the second set, such that all of the leads of the second set are similarly phased electrically with respect to the leads in the first set. In this system, the earth ground and the main power source are connected to the first set of leads of the balanced flux reactor and the corresponding members of the second set of leads are connected to the cable grounding conductor and power conductors. The balanced flux reactor is a transformer which has, at a minimum, one winding for each cable power conductor plus one for the cable grounding conductor; it may also have other windings, such as one for a pilot conductor to monitor ground conductor status. All of the transformer windings are wound on a common nominally non-saturable core, each winding being applied with the same number of turns, and all windings being applied in the same direction relative to the core.

In addition to providing short circuit and arc protection as intended, while avoiding the stated disadvantages present in the above-discussed prior art systems, the present invention has substantial further benefits. One advantage is that the balanced flux reactor tends to force a first current going through the reactor on one of its windings to return through the reactor on another one of its windings. This return current will be oppositely directed to the first current. The return current should also be equal in magnitude to the first current, so the magnetic flux from the first reactor winding will tend to cancel or balance out the magnetic flux of the second (current return) winding, hence the name balanced flux reactor. In other words, mutual inductance will tend to cancel self-inductance in both windings, so they will both tend to appear as non-inductive conductors. Thus, if a parallel return path were to exist for current to return outside of the balanced flux reactor, the reactor would place an impedance in that path; the return path through the reactor would then be favored due to its lower impedance. Therefore, short circuit ground currents will tend to favor the appropriate ground wire connected through the balanced flux reactor over some other ground path outside the power cables, whereon extensive current might result in damage to or faulty operation of current sensitive equipment.

An additional (pilot) winding in the balanced flux reactor may be employed to provide for ground wire monitoring. In such systems, the pilot wire in the cable is connected at one end to the pilot winding of the balanced flux reactor and to the machine frame at the other end. A current sent out on the pilot wire will normally return on the ground conductor. By monitoring the current in the pilot wire, a break in the ground conductor (or pilot wire) may be sensed. The main power source can then be deactivated while repairs are effectuated. When other ground paths are available in parallel to the cable grounding conductor, an opening grounding conductor will not reduce the current in the pilot wire to zero, as in the case of a break in the pilot wire. However, as these parallel ground paths lie outside the balanced flux reactor, there will be an impedance in such paths. Due to this impedance, current in the pilot wire will be less than that which would exist with an unbroken grounding conductor. Such a reduced level of current can also be sensed and used to signal the break in the grounding conductor.

DESCRIPTION OF A PREFERRED EMBODIMENT

Figure 1:
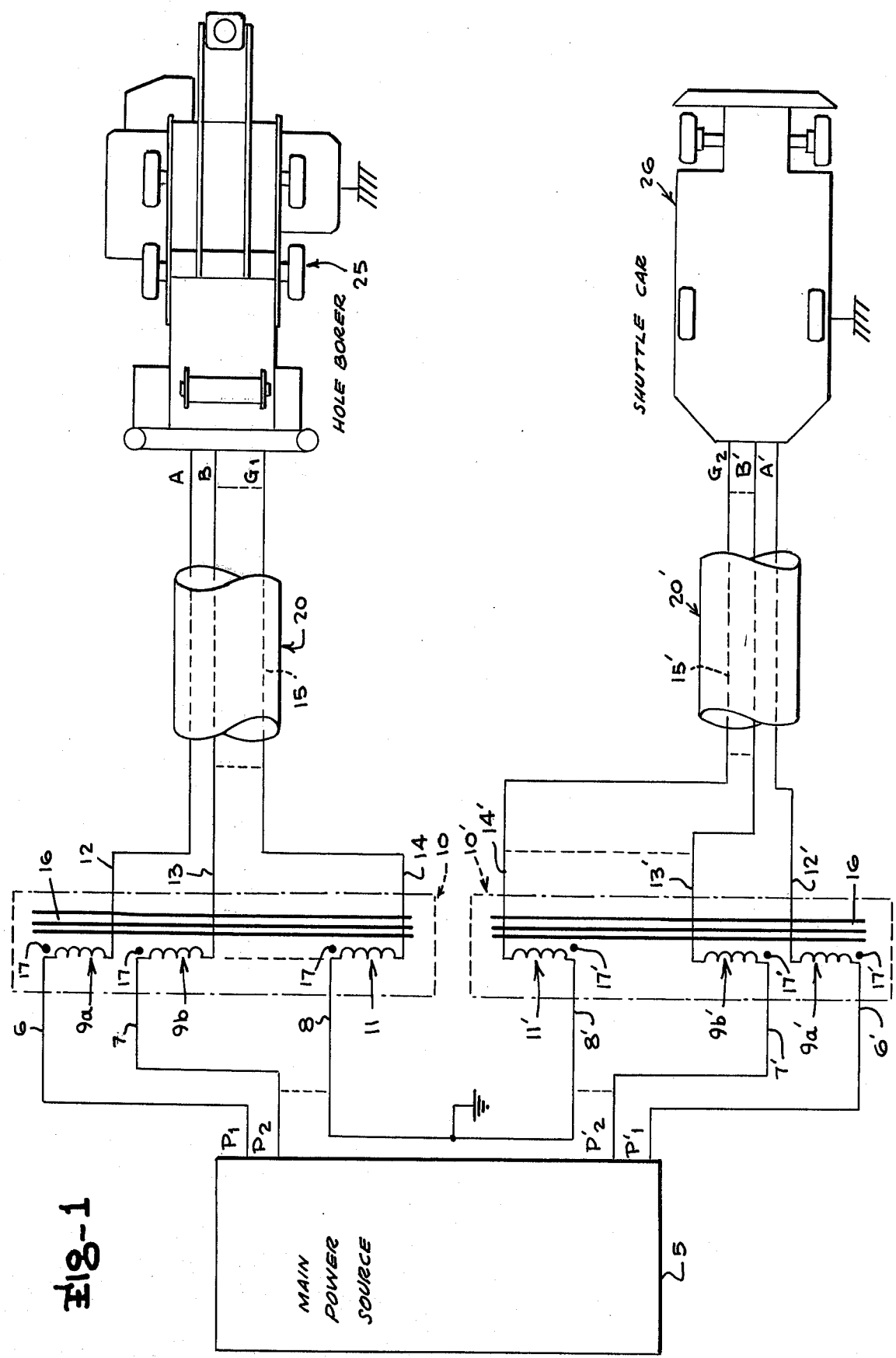
FIG. 1 is a combined block-circuit diagram of the new and improved power supply system showing the connection of a balanced flux reactor.

FIG. 1 depicts the improved power system of the present invention, supplying power to two mining machines, e.g. a hole borer and a shuttle car. Main power source 5 is shown as providing two power outputs $P_1$ and $P_2$ for a first machine 25 (e.g., a hole borer) and two power outputs $P_1'$ and $P_2'$ for a second machine 26 (e.g., a shuttle car). Power outputs $P_1$ and $P_1'$ are connected respectively to a first lead 6 and 6' of a first winding 9a and 9a' of balanced flux reactors 10 and 10'. Likewise, power outputs $P_2$ and $P_2'$ are respectively connected to a first lead 7 and 7' of a second winding 9b and 9b' of the balanced flux reactors 10 and 10'. The first lead 8 and 8' of another winding 11 and 11' is connected to the reference earth ground. All of said first leads of the balanced flux reactors 10 and 10' are connected to the input end of their respective windings.

The second leads 12, 13 and 12', 13' of windings 9a, 9b and 9a', 9b', respectively, connect the output end of their said windings to the cable power conductors through which power is transmitted to machines 25 and 26. Leads A, B and A', B' connect the load ends of the cable power conductors to machines 25 and 26. Second leads 14 and 14' of windings 11 and 11' connect the output end of each of said windings to the grounding conductors 15 and 15' of the cables 20 and 20'. Cable grounding conductors 15 and 15' terminate at the load ends of the power cables 20 and 20' in leads $G_1$ and $G_2$ which are connected to the conductive external housings of said machines 25 and 26, respectively.

Windings 9a, 9b, 11 and 9a', 9b', 11' are wound on respective common transformer cores 16 and 16'. Dots 17 and 17' are shown for the purpose of indicating that the first ends of windings 9a, 9b, 11 and 9a', 9b', 11' must have the same electrical phasing.

Figure 2:
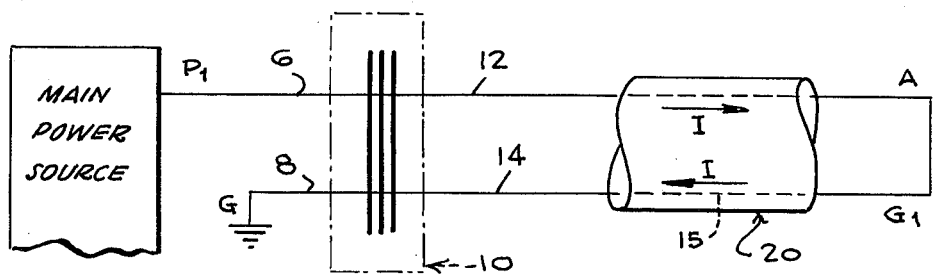
FIG. 2 is a circuit diagram showing the electrical equivalent circuit which results when there is a short circuit between a power conductor and a ground conductor.

The significant operational modes of the balanced flux reactor may be described in terms of the electrical equivalent circuits which result in response to the occurrence of short circuits and contact between housings of two machines. FIG. 2 shows the electrical equivalent circuit which results when a power conductor lead, such as lead A of hole borer 25 becomes short-circuited to a grounding conductor such as lead $G_1$. The short circuit current I first flows through the balanced flux reactor 10 from lead 6 to lead 12 of a first winding 9a and then returns through the balanced flux reactor in the opposite direction, from lead 14 to lead 8 of a second winding 11. The magnetic field self-induced from the current in each winding tends to be cancelled by the magnetic field induced in opposite electrical phase in the other winding, thus if there is complete linkage of the fluxes from the two magnetic fields, the windings will both appear to be simple conductors, rather than inductances. Under short circuit conditions, therefore, there is essentially no impedance in the ground system between lead $G_1$ and earth ground G to limit current handling capacity of grounding conductor 15.

Figure 3:
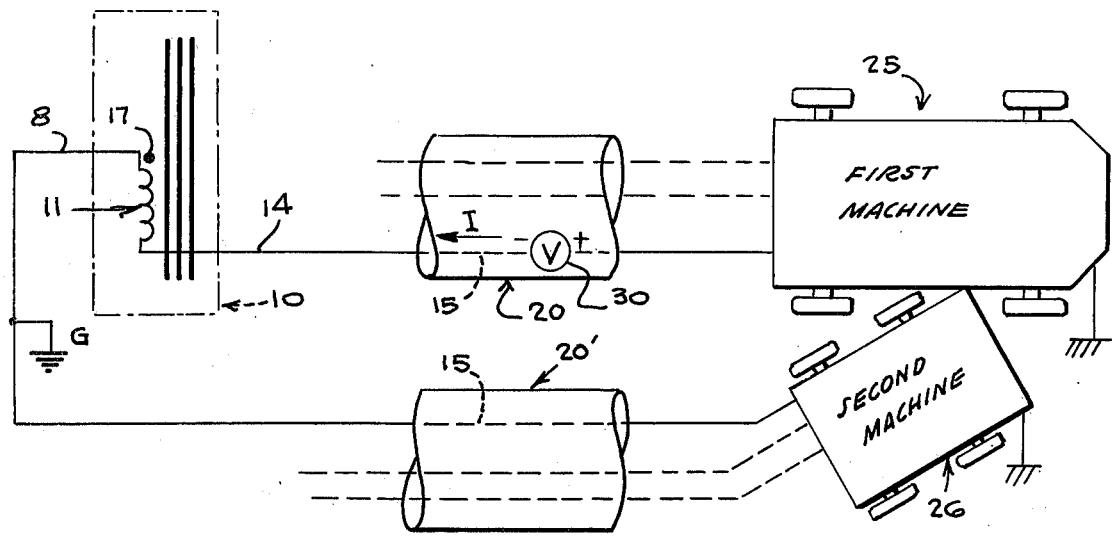
FIG. 3 is a circuit diagram showing the electrical equivalent circuit which results when two machines come in contact.

FIG. 3 illustrates the resulting electrical equivalent circuit when a voltage induced in a cable ground conductor causes a current to flow between the external housings of two machines 25 and 26 when they touch. The difference between the unbalanced induced voltages of two cables is depicted schematically by a voltage source 30 in series with the ground circuit of the first machine 25. Only one machine is shown as being connected through a balanced flux reactor 10, however the explanation is equally applicable if both machines are so connected. Winding 11 of balanced flux reactor 10 places a reactance or impedance in series with the cable grounding conductor 15 which carries a ground current I, which is the current flowing between the two machines due to the induced voltage. Since the current I passes through the balanced flux reactor 10 only once, we need not consider the effects of other windings as there is no balancing of fluxes. Winding 11 will limit the amplitude of current I according to the following relationship:

$$|I| = \frac{|V|}{|Z|},$$

in which Z represents the impedance of winding 11 and V represents the difference in the unbalanced voltages induced in the grounding conductors. The imbalance in the voltages induced in grounding conductors 15 and 15' of conventional power cables used to energize mining equipment, even under the worst conditions to be expected, do not usually exceed 6 or 7 volts, and are more commonly on the order of two volts. If the maximum permissible value of intermachine current I is to be 1.0 amps in accordance with the Bureau of Mines regulation, then the minimum value for the magnitude of the winding impedance, $$|Z|,$$

is about 7 ohms. The number of turns per winding, the size of the conductors to be used, transformer core size, shape and material can be selected according to standard transformer design criteria to achieve this impedance.

Although a particular embodiment of the invention has been described and illustrated herein, it is recognized that modifications, variations, and alternate embodiments may readily occur to those skilled in the art without departing from the spirit of the invention. Thus, it is intended that all such modifications and equivalents to the preferred embodiments are covered by the appended claims.

I claim:

1. In a power system for supplying electrical power from a main source of power to at least two separate loads each having a conductive external housing, wherein the system employs an inductive reactor in series with a grounding conductor connected between a conductive external housing and earth ground, the improvement comprising means for substantially balancing out or cancelling the self-inductance of said reactor upon the occurrence of a short circuit causing current to flow through said reactor.

2. In a power system for supplying electrical power from a main source of power to at least two separate machines, each machine being mounted upon a conductive external housing, the system employing a separate power cable for a first one of said machines, said power cable extending between said first machine and said main source of power, said power cable comprising at least one power conductor for delivering power to said first machine, and a grounding conductor one end of which is connected to the conductive external housing of said first machine and the other end of which is connected to a reference electrical earth ground, the improvement comprising the addition of a balanced flux reactor having first and second windings, said first winding being connected in series with said grounding conductor and said second winding being connected in series with said cable power conductor whereby dangerous arcs are prevented when the conductive external housings of two of said machines come into contact and there is substantially no impedance in series with the cable grounding conductor under short circuit conditions.

3. A balanced flux reactor comprising:
 a transformer core designed for use in nominally non-saturated condition; and
 at least two insulated conductors wound on said transformer core, said conductors each being wound in the same direction and with the same number of turns, wherein the number of turns per winding and the parameters of the transformer core are selected so that the impedance of each winding is at least so large as that which would limit current through the winding to 1.0 amperes, under the voltage imposed across the winding.

4. The balanced flux reactor of claim 3, for use in mining equipment, wherein five conductors are wound on the transformer core, three of said conductors for supplying three-phase A.C. power to a machine, one conductor to be connected to a grounding wire, and one conductor to be connected to a pilot wire for use in ground wire monitoring systems.

5. The method of coupling an electrical power supply to a load comprising the use, in series with a grounding conductor connecting said power supply to said load, of an electrically reactive element in combination with means for substantially balancing out or cancelling the reactance of said reactive element upon the occurrence of a short circuit causing current to flow through said reactive element.

6. The method of claim 5, wherein both the reactive element and the means for substantially cancelling out the reactance of the reactive element comprise inductors.

7. The method of claim 5, wherein said electrically reactive element comprises a first winding of a balanced flux reactor and the means for substantially cancelling out the reactance of the reactive element comprises a second winding of said balanced flux reactor, said second winding being connected in series with a phase or power conductor connecting said power supply to said load, in like phase with respect to the power supply as is connected said first winding.

8. The new use of a balanced flux reactor for limiting the amplitude of induced current in an electrical power cable ground conductor without limiting the amplitude of current present in said ground conductor upon the occurrence of a short circuit causing current to pass through said ground conductor.

* * * * *

UNITED STATES PATENT AND TRADEMARK OFFICE
CERTIFICATE OF CORRECTION

PATENT NO. : 4,037,265
DATED : July 19, 1977
INVENTOR(S) : Henry D. Smith

It is certified that error appears in the above-identified patent and that said Letters Patent are hereby corrected as shown below:

Column 1 is rewritten to include the letters and words omitted along its left border to read as shown on the attachment.

*Signed and Sealed this*

*Twenty-second* Day of *November 1977*

[SEAL]

Attest:

RUTH C. MASON
*Attesting Officer*

LUTRELLE F. PARKER
*Acting Commissioner of Patents and Trademarks*

ARC PREVENTING POWER SUPPLY SYSTEM

BACKGROUND OF THE INVENTION

1. Field of the Invention

This invention relates to electrical safety equipment and is specifically directed to an apparatus and a method for preventing electrical arcing between two or more machines receiving power through lengthy power cables from a common source. The invention is of particular importance in the suppression of the dangerous arcing which may occur when two or more electrical machines supplied from a common power source come into contact and then separate, as in the case of mining machinery operated in volatile, explosive atmospheres.

2. Description of the Prior Art

In numerous applications, power for electrical machinery is supplied through lengthy multi-conductor cables. Mining equipment, for example, may require cables from several hundred to several thousand feet long. Such lengthy cables are obviously highly susceptible to damage, giving rise to substantial shock and arcing hazards.

The first type of hazard is the possibility of short circuits occurring between two or more power conductors or between a power conductor and a ground conductor. One cause of such short circuits is damage to the power cable. Another cause is equipment failure, such as insulation breakdown and current leaks. A short circuit may result in dangerous voltage being placed on conductive external housings of electrically powered machines, such as the conductive frame of a mining car, which is hazardous both to workers and equipment.

The second type of hazard is caused by small differences in the unbalanced voltages which may be induced in the grounding conductors of two power cables when they are connected under load conditions. Where, as is frequently the case, the grounding conductor in the power cable is not symmetrically positioned with respect to the power conductors, such as in some three-phase alternating current systems (as are usually used for high-power equipment), a voltage may be induced in the ground conductors. Since the ground conductors of any two such machines are connected to the same reference earth ground, the unbalanced induction of voltage in the ground conductors may result in there being several volts (e.g., up to 6 or 7 volts) difference in potential between the conductive external equipment housings (e.g., supporting vehicles, frames, bases, enclosures, etc.) to which the ground conductors are attached. Since low impedance circuits are involved, even a small voltage can cause large currents in the ground conductors should the equipment housings come into contact. Then, upon separation of the housings, arcing will occur. In a possibly explosive environment, such as in the atmosphere of a coal mine, this arcing presents a severe hazard.

Connecting a grounding conductor between the housing of the involved mining equipment and reference earth ground reduces the shock hazard due to short circuits. By monitoring current in the grounding conductor, short circuits may be automatically detected; once this condition is detected, power may be automatically disconnected from the cable. Usually, power for motors or other machinery is provided by a three-phase high-voltage source; then, a Y-connected power supply transformer secondary can be used to establish a common reference point at the junction of